(12) United States Patent  
Nagatani (10) Patent No.: US 7,079,282 B2  
(45) Date of Patent: Jul. 18, 2006

(54) PRINT OUTPUT UNIT CALIBRATION SYSTEM

(75) Inventor: Masahiro Nagatani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 872 days.

(21) Appl. No.: 09/879,970

(22) Filed: Jun. 14, 2001

(65) Prior Publication Data

US 2001/0055420 A1   Dec. 27, 2001

(30) Foreign Application Priority Data

Jun. 21, 2000  (JP) .............................. 2000-186121

(51) Int. Cl.
*B41J 1/00* (2006.01)
*G06K 9/00* (2006.01)
(52) U.S. Cl. ...................... 358/1.9; 358/1.16; 382/167; 707/4
(58) Field of Classification Search ................ 358/523, 358/1.9, 3.23, 3.24, 1.15, 1.16, 504, 521, 358/518; 382/167, 169, 276, 277; 707/1, 707/102, 104, 205, 200
See application file for complete search history.

(56) References Cited

U.S. PATENT DOCUMENTS

| | | | | |
|---|---|---|---|---|
| 5,508,826 A | * | 4/1996 | Lloyd et al. ................ 358/501 |
| 5,664,072 A | * | 9/1997 | Ueda et al. .................. 358/1.9 |
| 5,825,394 A | * | 10/1998 | Gilbert et al. .............. 347/191 |
| 5,835,624 A | * | 11/1998 | Ueda et al. .................. 382/162 |
| 5,969,730 A | * | 10/1999 | Inose et al. .................... 347/14 |
| 6,151,135 A | * | 11/2000 | Tanaka et al. ............... 358/1.9 |
| 6,188,486 B1 | | 2/2001 | Yamada ..................... 358/1.15 |
| 6,333,790 B1 | * | 12/2001 | Kageyama ................. 358/1.15 |
| 6,819,439 B1 | * | 11/2004 | Hayashi et al. ............ 358/1.13 |
| 2003/0090688 A1 | | 5/2003 | Kimura ....................... 358/1.9 |

FOREIGN PATENT DOCUMENTS

EP          0 964 330 A2    12/1999
JP          09-034764 A      2/1997

* cited by examiner

*Primary Examiner*—King Y. Poon
*Assistant Examiner*—Lucas Divine
(74) *Attorney, Agent, or Firm*—Fitzpatrick, Cella, Harper & Scinto (57) ABSTRACT

The present invention aims to create a database for realizing proper correction processing in accordance with inherent difference and/or time-lapse change of an output unit. The present invention provides an image processing method comprising a holding step for holding an original database in which a correction condition corresponding to a reproducing property of an output unit is stored, a forming step for writing a correction condition formed by calibration processing in the original database to create a new database, and a correction processing step for effecting correction processing regarding input data by using the created new database, and wherein the calibration processing not only creates the new database but also forms a management file based on head identification information of a head used in the output unit.

8 Claims, 12 Drawing Sheets

```
73, 123,0,0,cnb_0731.tbl
73, 124,0,0,cnb_0732.tbl
73, 125,0,0,cnb_0733.tbl
73, 126,0,0,cnb_0734.tbl
73, 127,0,0,cnb_0735.tbl
73, 128,0,0,cnb_0736.tbl
```

FIG. 8

```
73,123,0,0,cnb_0731.tbl
73,124,0,0,cnb_0732.tbl
73,125,0,0,cnb_0733.tbl
73,126,0,0,cnb_0734.tbl
73,127,0,0,cnb_0735.tbl
73,128,0,0,cnb_0736.tbl
73,129,0,0,cnb_0737.tbl
73,130,0,0,cnb_0738.tbl
73,131,0,0,cnb_0739.tbl
73,132,0,0,cnb_073a.tbl
73,133,0,0,cnb_073b.tbl
73,134,0,0,cnb_073c.tbl
73,135,0,0,cnb_073d.tbl
73,136,0,0,cnb_073e.tbl
73,137,0,0,cnb_073f.tbl
73,138,0,0,cnb_073g.tbl
73,139,0,0,cnb_073h.tbl
73,140,0,0,cnb_073i.tbl
73,141,0,0,cnb_073j.tbl
73,142,0,0,cnb_073k.tbl
73,143,0,0,cnb_073l.tbl
73,144,0,0,cnb_073m.tbl
73,145,0,0,cnb_073n.tbl
73,146,0,0,cnb_073o.tbl
73,147,0,0,cnb_073p.tbl
73,148,0,0,cnb_073q.tbl
73,149,0,0,cnb_073r.tbl
73,150,0,0,cnb_073s.tbl
73,151,0,0,cnb_073t.tbl
73,152,0,0,cnb_073u.tbl
73,153,0,0,cnb_073v.tbl
73,154,0,0,cnb_073w.tbl
73,155,0,0,cnb_073x.tbl
73,156,0,0,cnb_073y.tbl
73,157,0,0,cnb_073z.tbl
```

FIG. 9

```
73,124,0,0,cnb_0732.tbl
73,125,0,0,cnb_0733.tbl
73,126,0,0,cnb_0734.tbl
73,127,0,0,cnb_0735.tbl
73,128,0,0,cnb_0736.tbl
73,129,0,0,cnb_0737.tbl
73,130,0,0,cnb_0738.tbl
73,131,0,0,cnb_0739.tbl
73,132,0,0,cnb_073a.tbl
73,133,0,0,cnb_073b.tbl
73,134,0,0,cnb_073c.tbl
73,135,0,0,cnb_073d.tbl
73,136,0,0,cnb_073e.tbl
73,137,0,0,cnb_073f.tbl
73,138,0,0,cnb_073g.tbl
73,139,0,0,cnb_073h.tbl
73,140,0,0,cnb_073i.tbl
73,141,0,0,cnb_073j.tbl
73,142,0,0,cnb_073k.tbl
73,143,0,0,cnb_073l.tbl
73,144,0,0,cnb_073m.tbl
73,145,0,0,cnb_073n.tbl
73,146,0,0,cnb_073o.tbl
73,147,0,0,cnb_073p.tbl
73,148,0,0,cnb_073q.tbl
73,149,0,0,cnb_073r.tbl
73,150,0,0,cnb_073s.tbl
73,151,0,0,cnb_073t.tbl
73,152,0,0,cnb_073u.tbl
73,153,0,0,cnb_073v.tbl
73,154,0,0,cnb_073w.tbl
73,155,0,0,cnb_073x.tbl
73,156,0,0,cnb_073y.tbl
73,157,0,0,cnb_073z.tbl
73,158,0,0,cnb_0731.tbl
```

PRINT OUTPUT UNIT CALIBRATION SYSTEM

BACKGROUND OF THE INVENTION

1. Field of the Invention

The present invention relates to image processing apparatus and method for producing a database in which correction conditions used in correction processing were stored by means of calibration processing, and a recording medium.

2. Related Background Art

For example, when an image composed on a personal computer is outputted by a printer, luminance signals R (red), G (green) and B (blue) as data of the image data must be color-converted into color signals Y (yellow), M (magenta) and C (cyan) (and, if necessary, K (black)). In such color conversion, generally, there is a non-linear relationship between an input space of the luminance signal and an output space of the color signal. As such, in the data conversion, if the relationship between the input and the output is nonlinear, it is not easy to model such conversion strictly for calculation, and, even when the conversion can be modeled to some extent, an amount of calculation required for the conversion itself my become extensive. In order to solve such problems regarding the data conversion, a method in which data conversion can be effected relatively easily by previously stored output data corresponding to input data in a look-up table is known.

In the past, pre-sought look-up tables were only varied from a recording medium to a recording medium, and, in the same model printer, the same look-up table was utilized regardless of conditions of an ink head and the printer.

However, in the pre-sought look-up table, if a reproducing property is changed due to inherent difference and/or time-lapse change of the printer body and/or the ink head, the optimum print result was not always obtained. For example, if magenta color is stronger, the entire output image tends to have excessive red color component thereby not to keep gray balance.

SUMMARY OF THE INVENTION

The present invention is made in consideration of the above-mentioned conventional drawback, and an object of the present invention is to be able to form a database for realizing proper correction processing in accordance with inherent difference and/or time-lapse change of an output portion.

Another object of the present invention is to be able to manage the formed database efficiently.

To achieve this object, the present invention provides an image processing method comprising a holding step for holding an original database in which a correction condition corresponding to a reproducing property of an output unit is stored, a forming step for writing a correction condition formed by calibration processing in the original database to create a new database, and a correction processing step for effecting correction processing regarding input data by using the created new database, and wherein the calibration processing not only creates the new database but also forms a management file based on head identification information of a head used in the output unit.

A further object of the present invention is to be able to form database properly.

To achieve this object, the present invention provides an image processing apparatus comprising holding means for holding an original database in which a correction condition corresponding to a reproducing property of an output unit is stored, forming means for writing a correction condition formed by calibration processing in the original database to create a new database, and correction processing means for effecting correction processing regarding input data by using the created new database, and wherein the calibration processing not only creates the new database but also forms a management file based on head identification information of a head used in the output unit.

The other objects and features of the present invention will be apparent from the following detailed explanation of the invention referring to the accompanying drawings.

DETAILED DESCRIPTION OF THE PREFERRED EMBODIMENTS

Now, preferred embodiments of the present invention will be explained with reference to the accompanying drawings.

Figure 1:
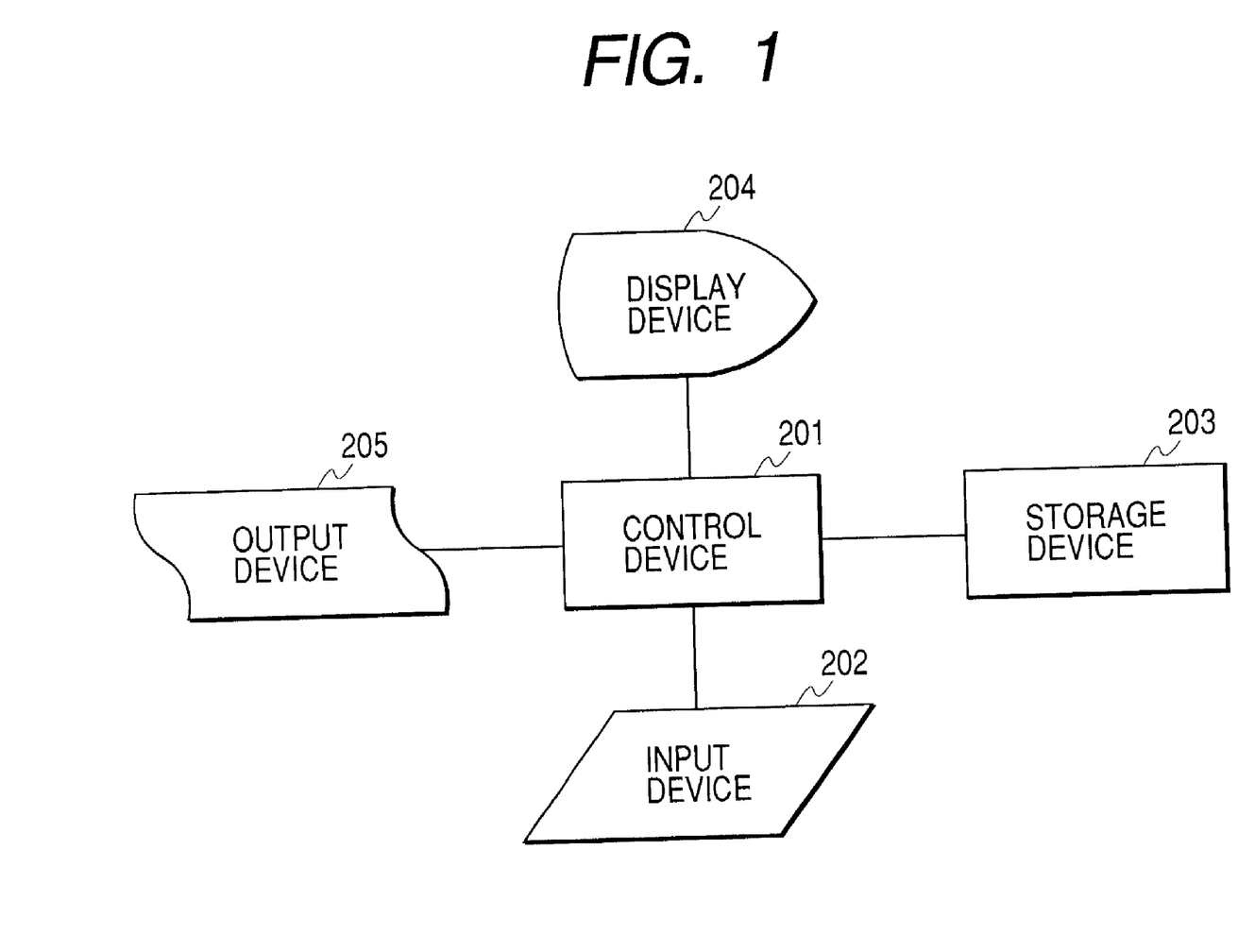
FIG. 1 is a block diagram showing a construction of an image processing system according to an embodiment of a data converting device.

FIG. 1 is a block diagram showing a construction of an image processing system according to an embodiment of a data converting device of the present invention.

An output device 205 may be, for example, a color printer and serves to effect color print output on a print paper by using four colors such as yellow (Y), magenta (M), cyan (C) and black (K). Incidentally, as the output device, a color printer using six or seven colors rather than four colors may be utilized.

Print date including density data regarding Y, M, C, K used in the output device 205 are produced by image processing (effected by a control device 201) of input data including multi-value luminance data regarding R (red), G (green) and B (blue) representing an input image. The image processing includes color correction, color conversion, gradation correction and quantization processing.

In the color correction processing, 8-bit RGB colors are color-corrected to 8-bit R'G'B' colors. Further, in the color conversion processing, the 8-bit R'G'B' colors are color-converted into 8-bit CMYK colors. Further, in the gradation correction processing, 8-bit C'M'Y'k colors are corrected to 8-bit C"M"Y"K" colors. Further, in the quantization processing, the 8-bit C"M"Y"K" colors are quantified to one-bit cmyk colors. In this case, the color correction, color conversion, gradation correction and quantization processing are effected by utilizing look-up tables (also referred to as "LUT" hereinafter).

The control device 201 includes a CPU which performs data processing regarding the system such as color conversion and initial processing therefor and control of operations of various mechanical elements (described later). A storage device 203 is constituted by memories such as ROM and RAM and external storage devices such as a hard disk and a floppy disk. In an embodiment of the present invention, the LUTs (look-up tables) and calculation sections which will be described later are stored in the storage device 203.

According to the system having the above-mentioned arrangement, for example, the following processing can be carried out.

Regarding an image stored in the storage device 203 and read by a scanner, an operator of the system instructs desired working by using an input device 202 comprised of a key board, a mouse and the like on the basis of an image displayed on a display device 204 such as CRT and produces a desired image. The produced desired image is printed out by the output device 205.

Incidentally, of course, the application of the present invention is not limited to the above-mentioned system. For example, it is well-known that color conversion processing is effected in a device such as a copying machine, and, it is apparent that the present invention can be applied to such a device or system.

Figure 2:
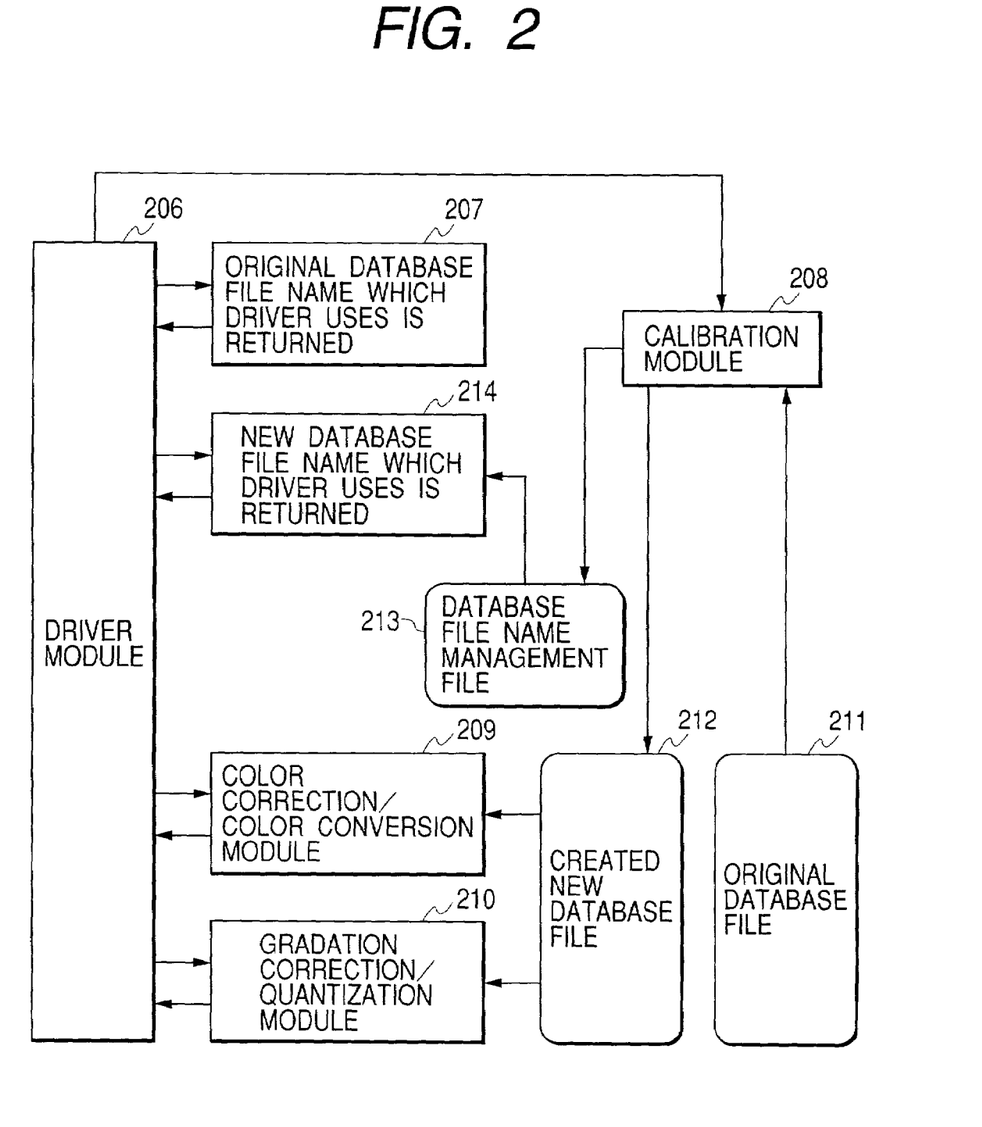
FIG. 2 is a conceptional view of calibration.

Now, the construction of the illustrated embodiment executed by the CPU of the control device 201 on the basis of program stored in the storage device 203 will be briefly explained with reference to FIG. 2.

A main body of a printer driver module 206 is a module for effecting the above-mentioned processing.

Figure 3:
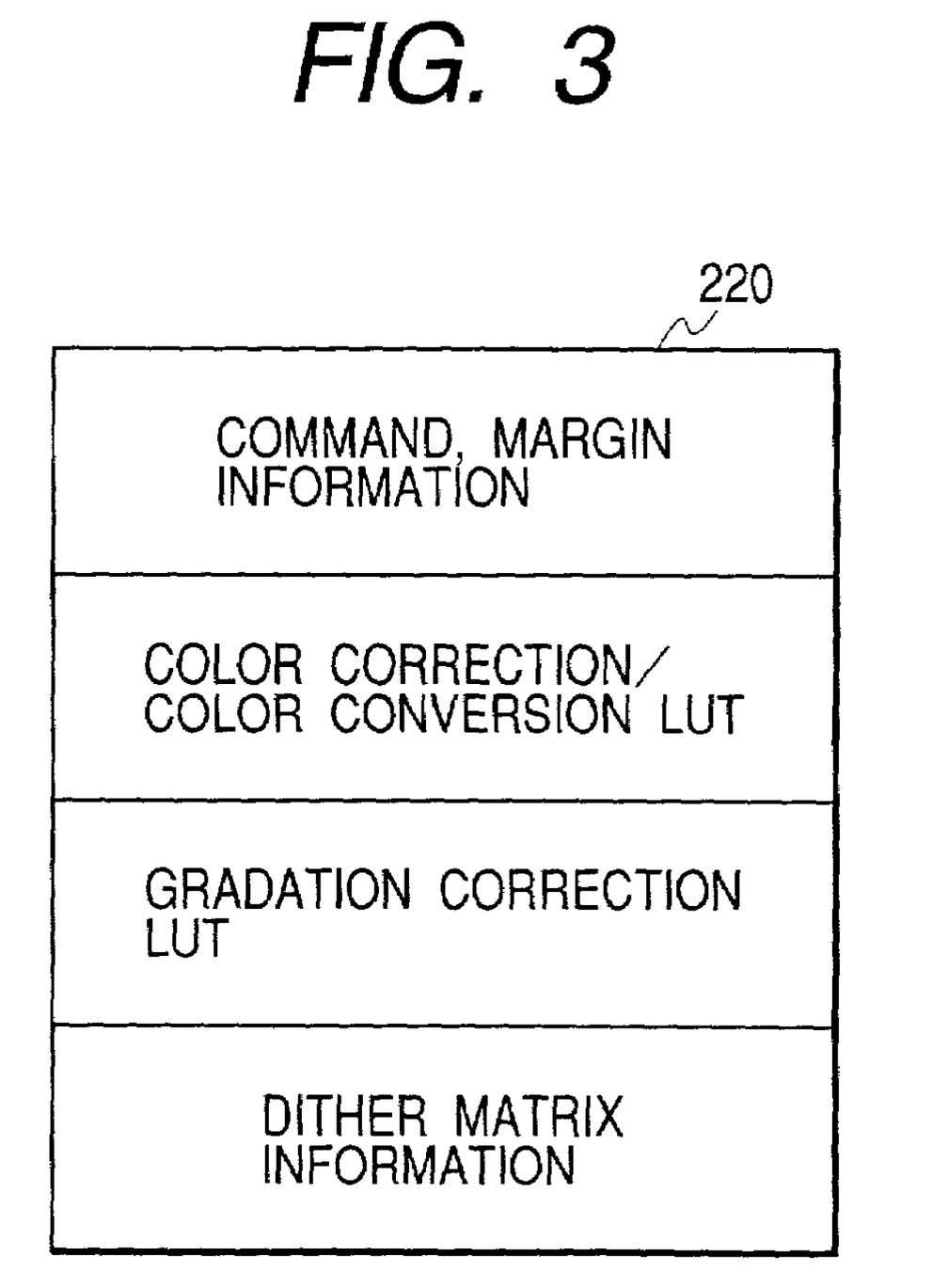
FIG. 3 is a view showing conception of a construction of a database file.

An original database file 211 of a printer database as shown in FIG. 3 including various default image processing conditions corresponding to types of printers, and, in this database, commands as printer type information, margin information, LUTs (interpolation look-up tables) required for color correction and color conversion, LUTs (gradation correction look-up tables) required for gradation correction processing, and a dither matrix required for quantization processing are included.

Figure 4:
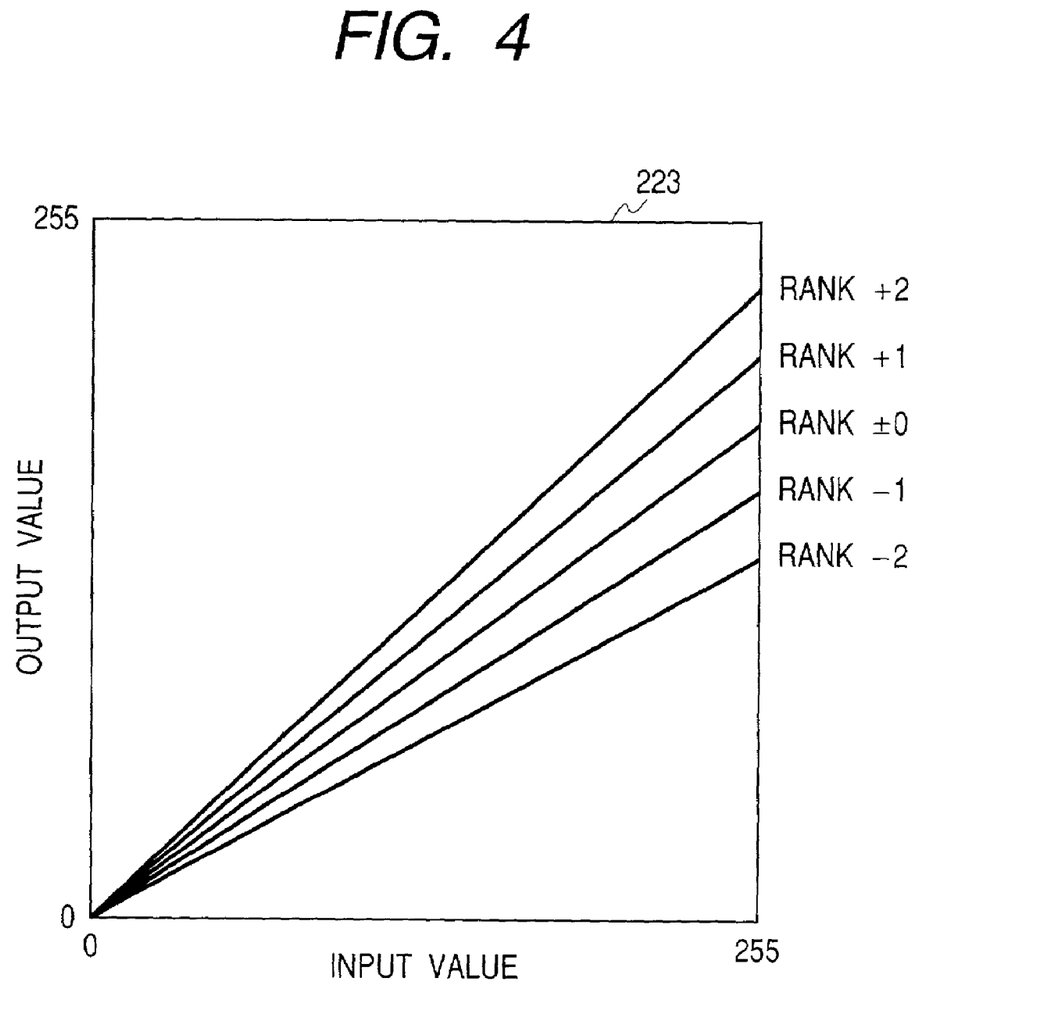
FIG. 4 is a view showing conception in which LUT of a gradation correction table is adjusted in accordance with a head rank.

A calibration module 208 serves to newly produce a database file 212 suitable for a reproducing property of the present printer on the basis of the original database file 211. Namely, the calibration module produces a database file depending upon inherent difference and/or time-lapse change of an ink head of the printer. For example, by picking up head ID as head identification information and head rank information (for example, C:+2, M:0, Y:−1, K:+1) as information representing the reproducing property of the head from the printer body by means of a printer driver and by informing the calibration module of such information, a database file including an LUT (gradation correction table 223 in FIG. 4) corresponding to such head rank is produced.

The calibration module serves to produce a new database file and also to produce a database name management file 213 for managing such a database file. The database name management file 213 is a file different from the image processing module and database file and manages the name of the new database table in correspondence to the head ID. Accordingly, when a new head is mounted, the calibration must be performed.

The calibration module may be started in accordance with instruction from driver utility or may be started automatically when print start command is emitted or when the driver is installed or when the head is exchanged.

Figure 5:
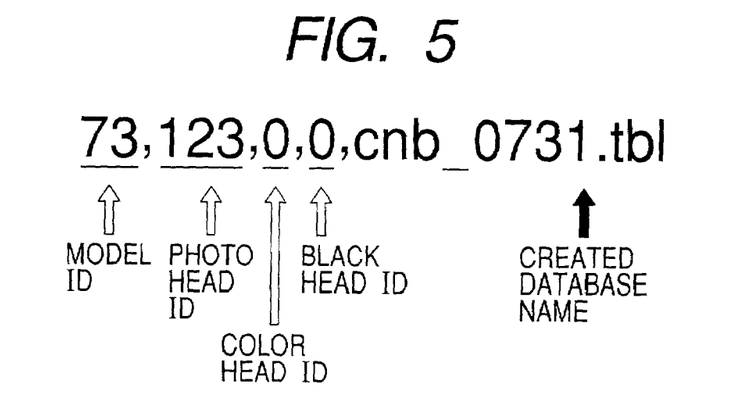
FIG. 5 is a view showing a format of a database management file in a printer corresponding one head.

An example of a one-head (for example, photo head) correspondence database file name management file in which only a single head can be mounted is shown in FIG. 5. Further, an example of two-head (black head and color head) correspondence database file name management file which is operated with two heads simultaneously mounted is shown in FIG. 6.

Figure 6:
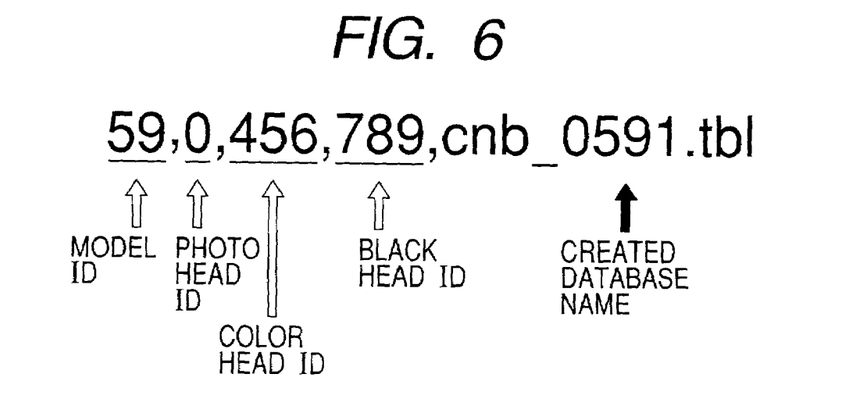
FIG. 6 is a view showing a format of a database management file in a printer corresponding two heads.

In FIGS. 5 and 6, formats of the management files are the same, and model ID as model information, photo head ID, color head ID, black head ID and database file name are included as a set.

As shown in FIG. 5, the one-head correspondence new database file is managed by using the model ID and the photo head ID in the set. On the other hand, the plural-head correspondence new database file is managed by using the model ID, color head ID and black head ID. Namely, the file name is formed to correspond to the combination of the heads.

In this way, by managing the database by using the head IDs for respective heads, management can be effected with high accuracy.

Figure 7:
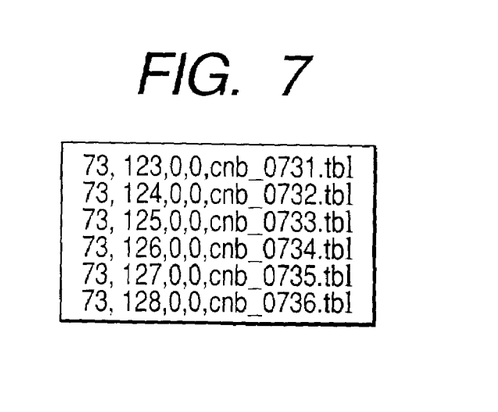
FIG. 7 is a view for explaining an example of registration of the database management file.
Figure 8:
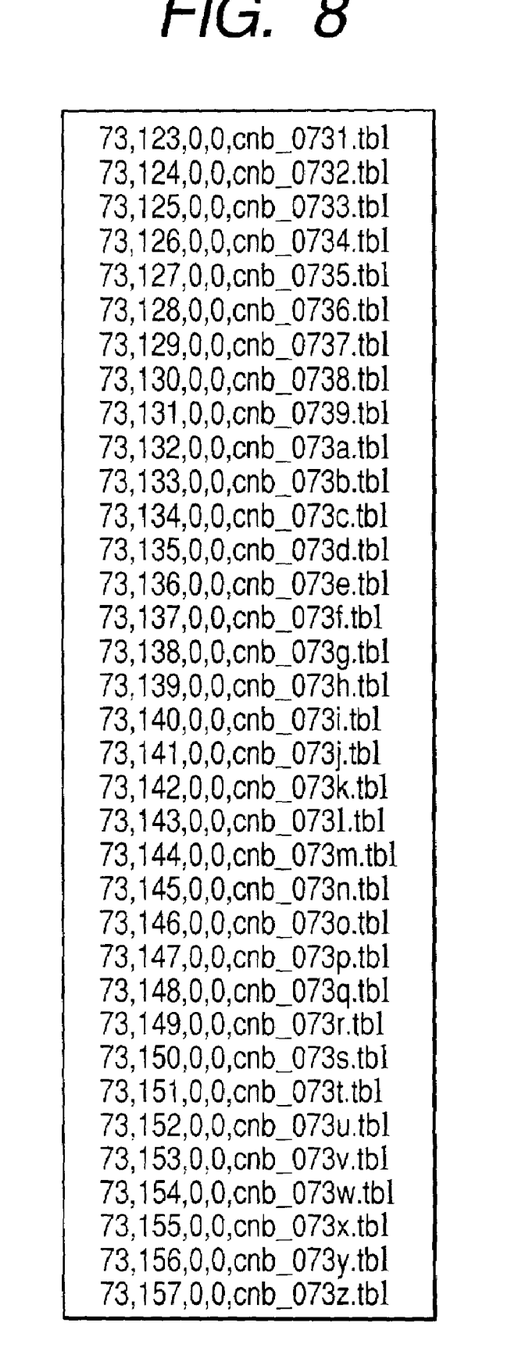
FIG. 8 is a view for explaining a case where data up to z is registered in the database management file.
Figure 9:
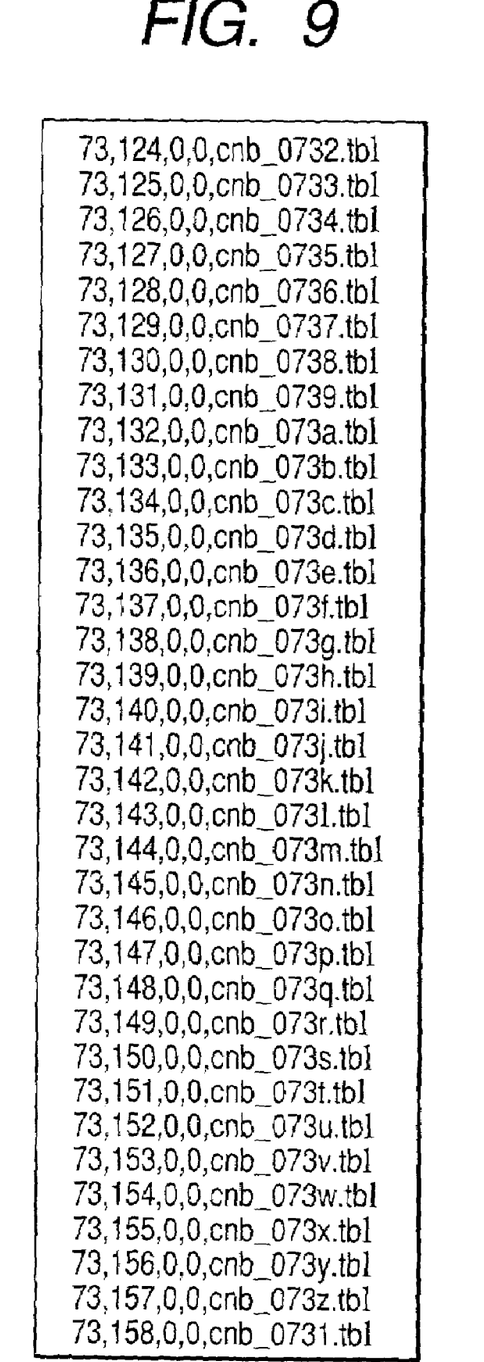
FIG. 9 is a view for explaining a case where data 1 is registered again in the database management file.

Whenever a head having different head ID is mounted to the printer, such fact is additionally registered as shown in FIG. 7. In the registration, the original database file is set as cnb_0730.tb1, and, as shown in FIG. 8, the file names are registered in such a manner that only the lowest order (0) of 0730 is changed successively from 1 to 9 and then from a to z. When z is reached, first of all, the line is deleted and then "1" is registered again in the last line (FIG. 9), thereby newly forming a database file cnb_0731.tb1.

According to the management file of the illustrated embodiment, it can easily be judged whether the database is original or not, and the file numbers of the databases can be limited, with the result that the capacity of the hard disk can be prevented from being compressed and the burden of the system can be reduced.

Figure 14:
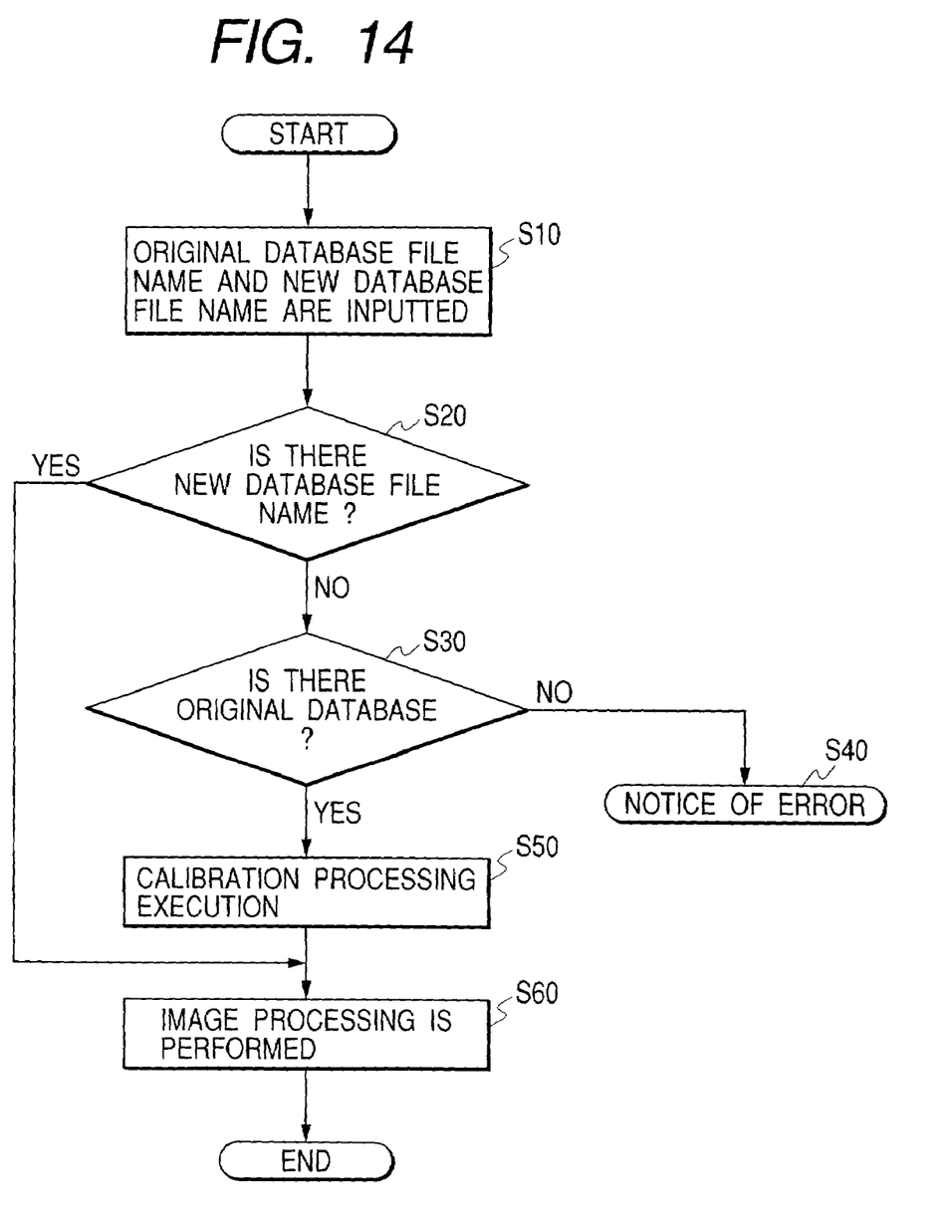
FIG. 14 is a flow chart for explaining an operation of a driver module.

Now, the operation of the printer module during the printing will be explained with reference to FIG. 14.

The printer driver module calls out a module 207 and acquires the original database file name. Further, the modules calls out a module 214 in order to acquire the file name of the new database file formed by the calibration and acquires the file name of the database corresponding to the head ID from the management file 213 (step S10). The module 207 returning the database file name previously holds the file name of the original database.

If the file name of the new database cannot be acquired (step S20), since the database corresponding to the head ID is not registered, the calibration is carried out by a calibration module 208. First of all, the original database corresponding to the original database name acquired in the step S10 is read out from the original database file 211. If the original database cannot be read out (step S30), since the new database cannot be formed, notice of error is given to the operator (step S40). If the original database is read out (step S30), the calibration processing is executed (step S50).

On the other hand, if the file name of the new database is acquired, the new database is read out from the new database file 212 and the image processing is executed. Further, in the step S50, when the new database is firmed by executing the calibration, the image processing is effected by using the formed new database (step S60). More specifically, by calling out a color correction/color conversion module 209 and a quantization/gradation correction module 210 under the file name of the acquired new database and by executing the image processing, the optimum printing result can be obtained by utilizing LUT corresponding to the mounted head.

Figure 10:
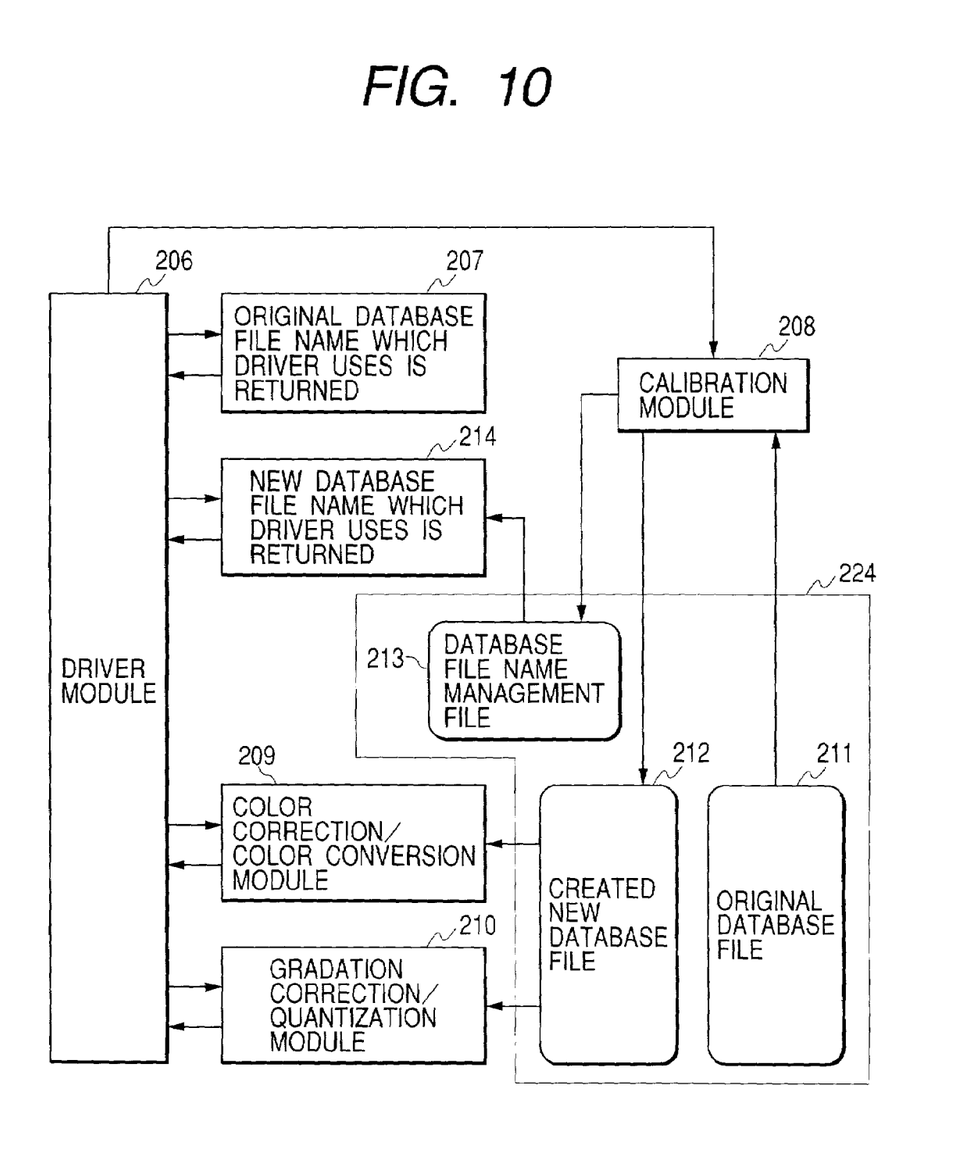
FIG. 10 is a conceptional view showing a case where an original database file, a new database file and an management file are stored in a single discrete holder.

Upon uninstallation of the printer driver, all of the database files and the management files which were formed up to now are deleted. As shown in FIG. 10, the database file name management file 213, new database file 212 and original database file 211 are stored in the same holder, and, by storing only these files in this holder, upon uninstallation, the database can be deleted only by deleting this holder (224 in FIG. 10). According to this method, it is not needed to ascertain which files are stored in the holder, and, thus, the uninstalling operation can easily be performed.

Next, a method for forming the gradation correction table to be formed by the calibration will be explained. The calibration serves to form the database on the basis of the inherent difference and/or time-lapse change of the printer body and/or the ink head.

For example, by analyzing the head identification information by the printer body to which the head is amounted, the head ID and the head rank information are obtained, and the printer driver picks up the head ID and the head rank information (for example, C:−2, M:+2, Y:+1, K:0) from the printer body and informs the calibration module of such information. The calibration module produces the new database file including LUT corresponding to the head rank from the original database.

Alternatively, in place of the fact that the rank information is inputted from the printer body, a head rank judged by the operator on the basis of a test image printed by the printer body may be inputted.

Now, an example of a method for producing the LUT corresponding to the head rank, which method is effected by the calibration module, will be explained.

Figure 13:
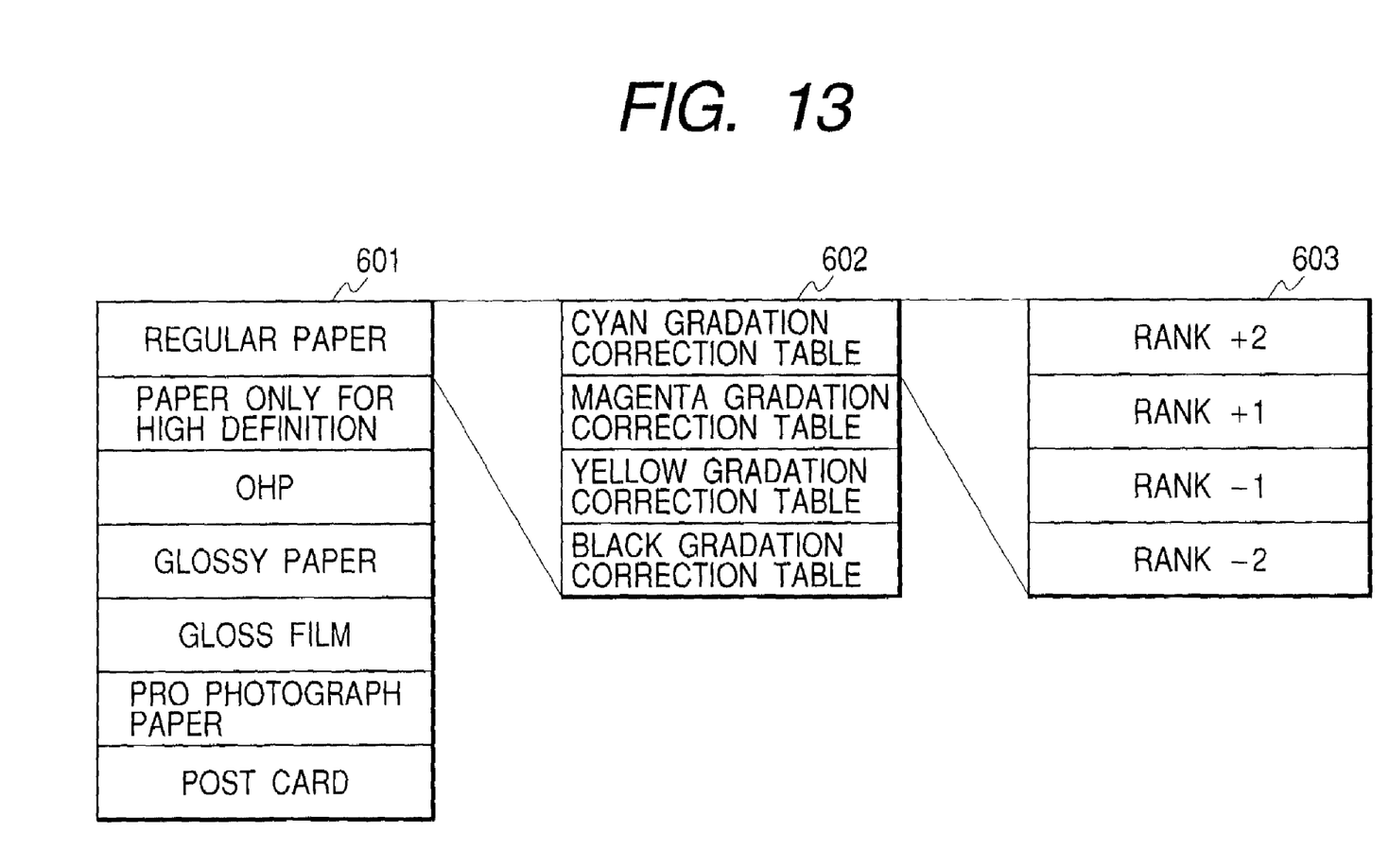
FIG. 13 is a conceptional view showing calibration gradation tables held by media.

(1) Case Where the Calibration Module Holds Gradation Correction Tables for Respective Head Ranks:

As shown in FIG. 13, gradation correction tables corresponding to all ranks 603 regarding all colors 602 in all media 601 are held in the calibration module. On the basis of the inputted rank, the gradation correction table is formed.

Figure 11:
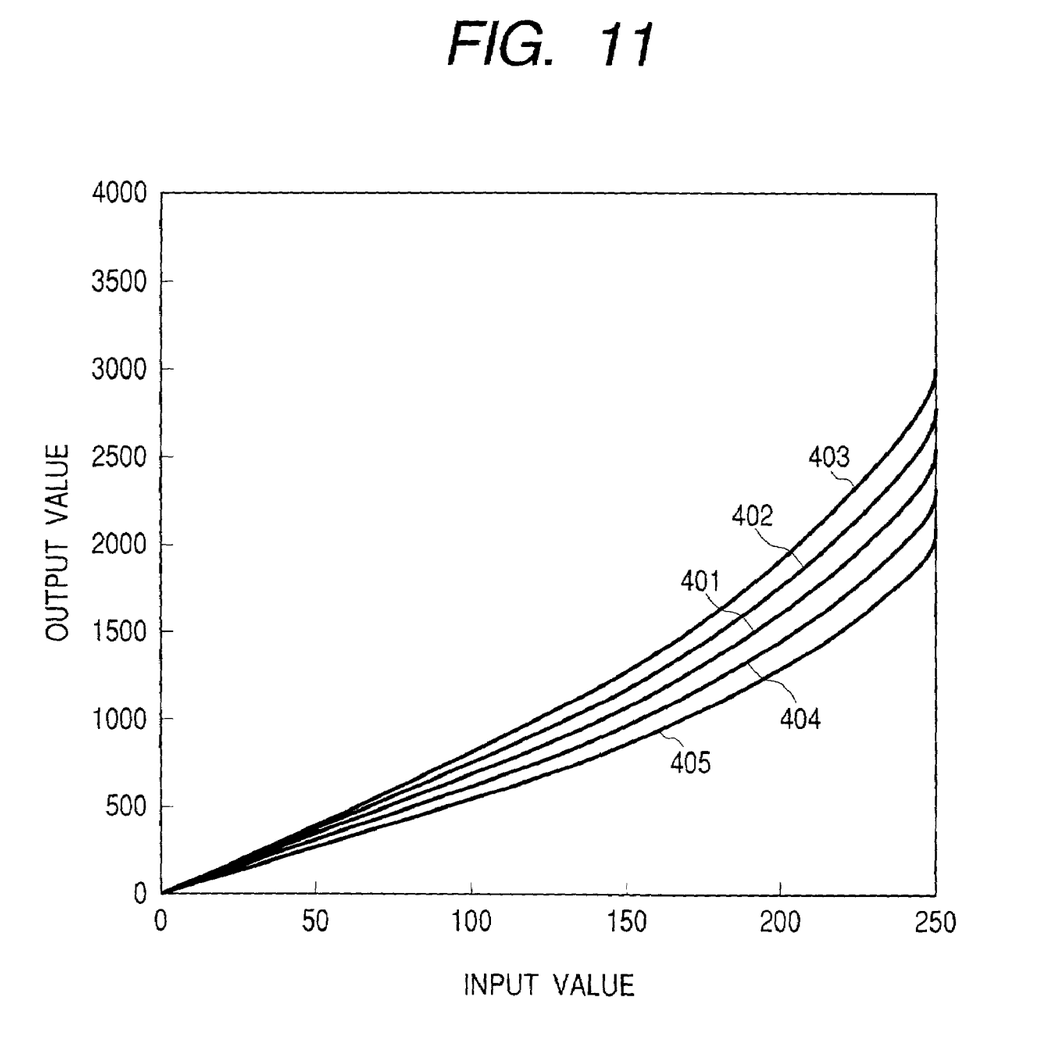
FIG. 11 is a graph showing a gradation correction table when gradation correction tables for respective head ranks are held in a calibration module.
Figure 12:
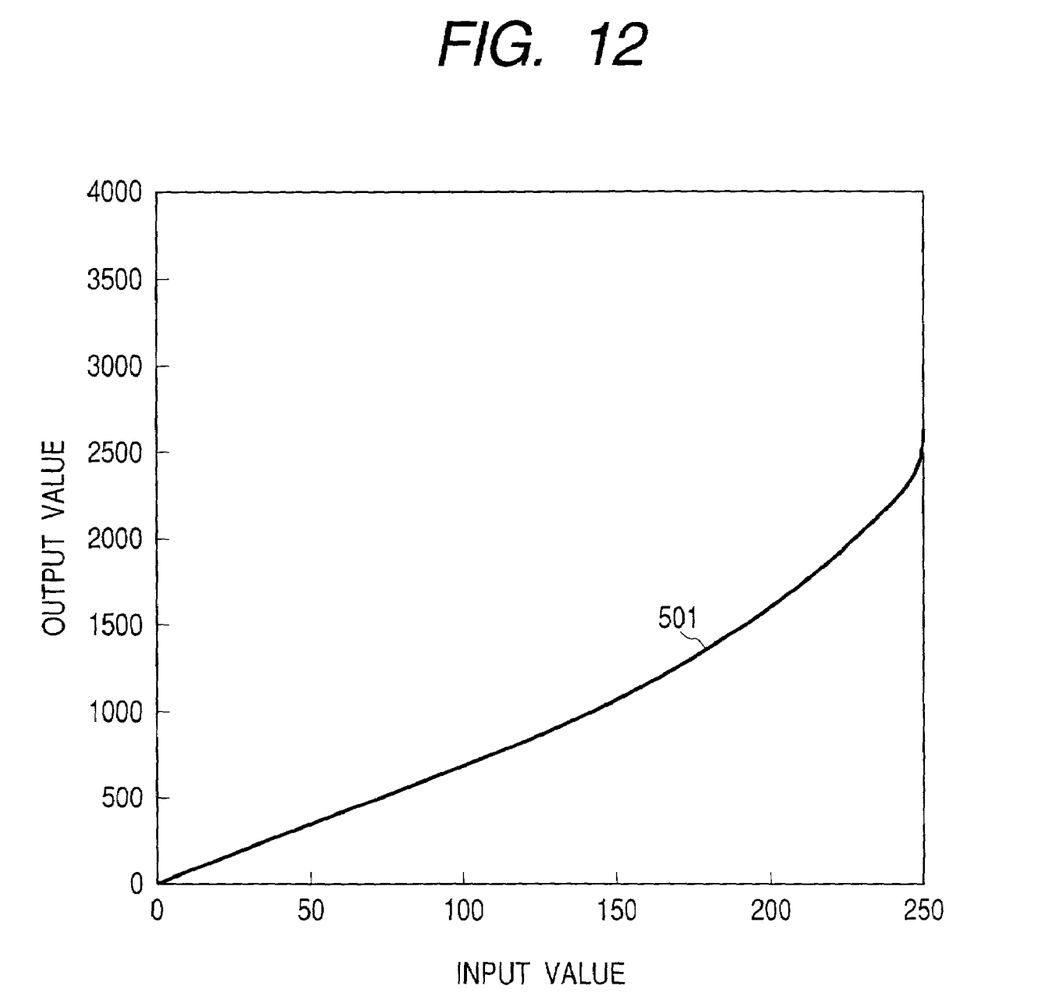
FIG. 12 is a graph showing an original table when the calibration module carried out by numerical formula.

An example of the gradation correction tables corresponding to the respective head ranks 603 is shown in FIG. 11. In FIG. 11, in order to enhance the accuracy of the gradation correction processing, input values 0 to 255 (8-bit) are corresponded to output values 0 to 4096 (12-bit).

A gradation correction value 405 corresponds to head rank "+2", a gradation correction value 404 corresponds to head rank "+1", a gradation correction curve 402 corresponds to head rank "−1", and a gradation correction curve 403 corresponds to head rank "−2". A gradation correction value 401 is an original gradation correction value and corresponds to head rank "0".

The rank "+" represents the fact that an ink discharge amount is great in comparison with the rank "0" and the fact that the ink is stronger. On the other hand, the rank "−" represents the fact that the ink discharge amount is smaller and the ink is weaker.

For example, when the head rank is Cyan:−2, Magenta:+2, Yellow:+1 and Black:0, since the output image tends to have excessive red color component if the print is effected without calibration, in the calibration module 208, the original database table 211 is loaded and the following gradation correction values for respective colors are sought in accordance with the head rank, thereby forming the new database file 212:

Calibration Cyan correction value=gradation correction table for Cyan rank −2;

Calibration Magenta correction value=gradation correction table for Magenta rank +2;

Calibration Yellow correction value=gradation correction table for Yellow rank +1; and Calibration Black correction value=black original gradation correction table.

In actual, the gradation correction tables are required in number of 112 (=number of media×number of colors×number of ranks=7×4×4). The capacity is 114.688 Kbyte (=112×1024 byte). Although there is a problem that size is increased if the number of combinations is great, since any tables can be held, easy utilization can be attained.

(2) Case Where the LUT is Sought by Numerical Formula in the Calibration Module:

The gradation correction tables (as original gradation correction values) corresponding to the rank "0" for all colors in all media is held by the original database file. The calibration module calculates the gradation correction values corresponding to the inputted head rank on the basis of the original gradation correction values held by the read-out original database file, in the following manner:

Head rank: +2→original gradation correction value (501 in FIG. 5) is set to 80%;

Head rank: +1→original gradation correction value (501 in FIG. 5) is set to 90%;

Head rank: 0→original gradation correction value (501 in FIG. 5);

Head rank: −1→original gradation correction value (501 in FIG. 5) is set to 110%; and Head rank: −2→original gradation correction value (501 in FIG. 5) is set to 120%.

For example, when the head rank is Cyan:−2, Magenta:+2, Yellow:+1 and Black:0, since the output image tends to have excessive red color component if the print is effected without calibration, in the calibration module 208, the original gradation correction table 211 of the original database table is read out, and the gradation correction values for respective colors are calculated in accordance with the head rank, thereby forming the new database file 212:

Calibration Cyan gradation correction value=original Cyan gradation correction value×1.2    (formula 1);

Calibration Magenta gradation correction value=original Magenta gradation correction value×0.8    (formula 2);

Calibration Yellow gradation correction value=original Yellow gradation correction value×0.9    (formula 3); and Calibration Black gradation correction value=original Black gradation correction value    (formula 4).

Incidentally, the (formula 1), (formula 2), (formula 3) and (formula 4) may be different for each color and for each medium.

In this way, by effecting the calculation on the basis of the formulae, the size of the calibration module can be reduced. However, to achieve this, the gradation properties between the ranks must be analogous. Thus, this is not always applicable to all of media, and, therefore, the utilization is made poor.

Further, the above-mentioned methods (1) and (2) may be switched in the calibration module. In addition, the calibration may be effected only regarding the desired media and/or desired positions.

Further, the calibration may be effected regarding not only the media alone but also combinations with other print mode or elements.

Further, the calibration may be used to form, for example, LUTs required for the color correction/color conversion, rather than the gradation correction tables. When such LUTs are formed, a plurality of patches may be formed by the printer and the formed patches may be measured and the LUTs may be formed on the basis of the measured results.

According to the illustrated embodiment, by forming and editing the database including the look-up tables on the basis of the inherent difference and/or time-lapse change of the printer body and/or the ink head, the optimum print result can always be obtained. For example, in the case where, due to the inherent difference of the color head, the magenta color is totally stronger so that the entire output image tends to have excessive red color component thereby not to keep gray balance, the image processing for correcting the inherent difference by using the calibration can be performed.

(Alterations)

A technique in which software program code for realizing the function according to the illustrated embodiment (for example, function executed by the flow chart of FIG. 14 and having the construction shown in FIG. 2) is supplied and various devices are operated by the stored program via a computer (CPU or MPU) of a system or an apparatus is also included in the present invention.

In this case, since the function according to the illustrated embodiment is realized by the software program code itself, the software program code itself and means for supplying the software program code to the computer (for example, storing medium for storing the program code) constitute the present invention.

The storing medium for storing the program code may be, for example, a floppy disk, a hard disk, an optical disk, a photomagnetic disk, CD-ROM, a magnetic tape, a non-volatile memory card, ROM or the like.

Further, also when not only the function according to the illustrated embodiment is realized by executing the program code supplied to the computer, but also the function according to the illustrated embodiment is realized by cooperating the program code with OS (operating system) running on the computer or other application, such program code is included in an embodiment of the present invention.

While the present invention has been explained with reference to the preferred embodiments thereof, various alterations and modifications can be made within the scope of the present invention.

What is claimed is:

1. An image processing method comprising:
   a holding step for holding an original database in which a correction condition corresponding to a reproducing property of an output unit is stored;
   a forming step for, as calibration processing, acquiring from the original database a gradation correction table, the gradation correction table corresponding to a recording medium to which image output is executed and head rank information of a head used in said output unit to create a new database, wherein the calibration processing not only creates said new database but also forms a management file indicating the new database has already been created; and
   a correction processing step for effecting correction processing regarding input data by using the created new database,
   wherein, when the image output is executed by said output unit, it is confirmed whether or not a new database file corresponding to the head used in said output unit has already been created, and
   wherein the creation of the new database file is executed if it is confirmed that the new database file is not yet created, and the creation of the new database file is not executed if it is confirmed that the new database file has already been created.

2. An image processing method according to claim 1, wherein said management file is held in a file different from a file for holding said new database.

3. An image processing method according to claim 1, wherein said output unit uses a plurality of heads, the database file is managed on the basis of a combination of the head identification information of said heads.

4. An image processing method according to claim 1, wherein the number of databases created by the calibration is controlled on the basis of said management file, and, when the number of created databases becomes greater than a predetermined value, an oldest database in other already created databases is deleted.

5. An image processing method according to claim 1, wherein upon uninstallation of a printer driver, all of the created database file and the management files are deleted.

6. An image processing apparatus comprising:
   holding means for holding an original database in which a correction condition corresponding to a reproducing property of an output unit is stored;
   forming means for, as calibration processing, acquiring from the original database a gradation correction table, the gradation correction table corresponding to a recording medium to which image output is executed and head rank information of a head used in said output unit to create a new database, wherein the calibration processing not only creates said new database but also forms a management file indicating the new database has already been created; and
   correction processing means for effecting correction processing regarding input data by using the created new database,
   wherein, when the image output is executed by said output unit, it is confirmed whether or not a new database file corresponding to the head used in said output unit has already been created, and
   wherein the creation of the new database file is executed if it is confirmed that the new database file is not yet created, and the creation of the new database file is not executed if it is confirmed that the new database file has already been created.

7. A computer-readable storage medium which stores therein a program for executing an image processing method comprising:

a holding step for holding an original database in which a correction condition corresponding to a reproducing property of an output unit is stored;

a forming step for, as calibration processing, acquiring from the original database a gradation correction table, the gradation correction table corresponding to a recording medium to which image output is executed and head rank information of a head used in said output unit to create a new database, wherein the calibration processing not only create said new database but also forms a management file indicating the new database has already been created; and a correction processing step for effecting correction processing regarding input data by using the created new database, wherein, when the image output is executed by said output unit, it is confirmed whether or not a new database file corresponding to the head used in said output unit has already been created, and wherein the creation of the new database file is executed if it is confirmed that the hew database file is not yet created, and the creation of the new database file is not executed if it is confirmed that the new database file has already been created.

8. An image processing method comprising:

a holding step for holding an original database in which a correction condition corresponding to a reproducing property of an output unit is stored;

a forming step for, as calibration processing, acquiring from the original database a gradation correction table, the gradation correction table corresponding to a recording medium to which image output is executed and head rank information of a head used in said output unit to create a new database, wherein the calibration processing not only creating said new database but also forming a management file indicating the new database has already been created; and a correction processing step for effecting correction processing regarding input data by using the created new database, wherein, when the image output is executed by said output unit, it is confirmed whether or not a new database file corresponding to heads used in said output unit has already been created, and wherein the creation of the new database file is executed if it is confirmed that the hew database file is not yet created, and the creation of the new database file is not executed if it is confirmed that the new database file has already been created.

* * * * *

UNITED STATES PATENT AND TRADEMARK OFFICE
CERTIFICATE OF CORRECTION

PATENT NO. : 7,079,282 B2  
APPLICATION NO. : 09/879970  
DATED : July 18, 2006  
INVENTOR(S) : Masahiro Nagatani Page 1 of 1

It is certified that error appears in the above-identified patent and that said Letters Patent is hereby corrected as shown below:

COLUMN 1:
Line 24, "my" should read -- may --.

COLUMN 2:
Line 63, "date" should read -- data --.

COLUMN 3:
Line 7, "C'M'Y'k'" should read -- C'M'Y'K' --; and
Line 10, "cmyk" should read -- CMYK --.

COLUMN 5:
Line 6, "firmed" should read -- formed --.

COLUMN 6:
Line 20, "actual," should read -- actuality, --; and
Line 22, "114.688 Kbyte" should read -- 114,688 Kbyte --.

COLUMN 9:
Line 10, "create" should read -- creates --; and
Line 21, "hew" should read -- new --.

COLUMN 10:
Line 20, "hew" should read -- new --.

Signed and Sealed this

Tenth Day of April, 2007

JON W. DUDAS  
*Director of the United States Patent and Trademark Office*